United States Patent
Okunseinde et al.

(10) Patent No.: US 7,283,986 B2
(45) Date of Patent: Oct. 16, 2007

(54) END-TO-END BUSINESS INTEGRATION TESTING TOOL

(75) Inventors: Foluso Olaiya Okunseinde, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/821,137

(22) Filed: Apr. 8, 2004

(65) Prior Publication Data

US 2005/0234845 A1 Oct. 20, 2005

(51) Int. Cl.
*G06F 7/00* (2006.01)
*G06F 17/30* (2006.01)
*G06F 9/44* (2006.01)

(52) U.S. Cl. .................. 707/1; 707/2; 707/10; 717/124

(58) Field of Classification Search .................. 717/124
See application file for complete search history.

(56) References Cited

U.S. PATENT DOCUMENTS

| | | | | |
|---|---|---|---|---|
| 6,256,676 | B1 | 7/2001 | Taylor et al. ................ | 709/246 |
| 6,505,342 | B1 | 1/2003 | Hartmann et al. ........... | 717/104 |
| 2002/0169644 | A1 | 11/2002 | Greene ........................... | 705/7 |
| 2003/0025732 | A1 | 2/2003 | Prichard ...................... | 345/765 |
| 2003/0037174 | A1 | 2/2003 | Lavin et al. ................. | 709/313 |
| 2003/0123446 | A1 | 7/2003 | Mulrhead et al. ........... | 370/392 |
| 2003/0163585 | A1 | 8/2003 | Elderon et al. ............. | 709/246 |
| 2003/0195765 | A1* | 10/2003 | Sehgal et al. .................. | 705/1 |
| 2004/0181471 | A1* | 9/2004 | Rogers ........................ | 705/31 |
| 2005/0044197 | A1* | 2/2005 | Lai ............................. | 709/223 |
| 2005/0177820 | A1* | 8/2005 | Mei et al. .................... | 717/129 |

OTHER PUBLICATIONS

Gavin et al("IBM WebSphere Application Server V5.0 System Management and Configuration: WebSphere Handbook Series" published on Apr. 17, 2003 by IBM http://proquest.safaribooksonline.com/0738426547?tocview=true.).*

* cited by examiner

*Primary Examiner*—Sam Rimell
*Assistant Examiner*—Jared M Bibbee
(74) *Attorney, Agent, or Firm*—Duke W. Yee; Herman Rodriguez; Gerald H. Glanzman

(57) ABSTRACT

A tool is provided for testing integration logic in a hub-and-spoke integration scheme. The testing tool exercises all spokes of the integration project for all objects in the model. A test document is sent to each adapter, which converts the generic objects to application specific objects and then converts the application specific objects back to generic objects. The testing tool then documents the return document of each spoke. The result is a catalog of total mappings, partial mappings, and empty mappings. These results may be analyzed to identify disagreements, lost data, and unused fields. The model may then be corrected by updating the mappings.

27 Claims, 6 Drawing Sheets

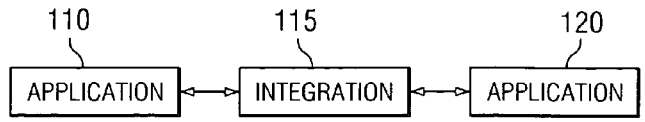
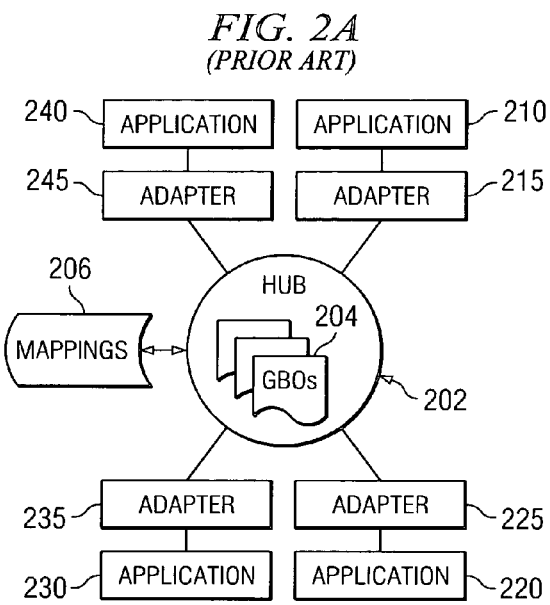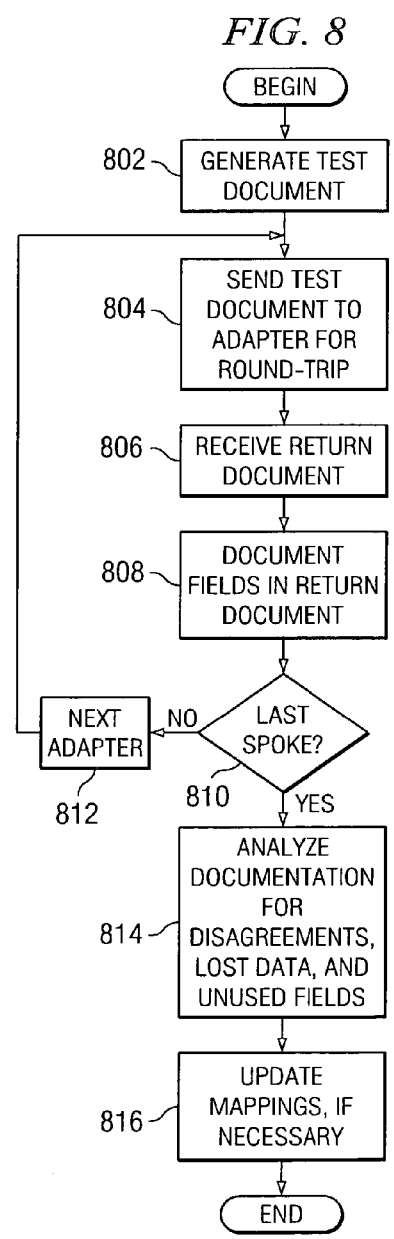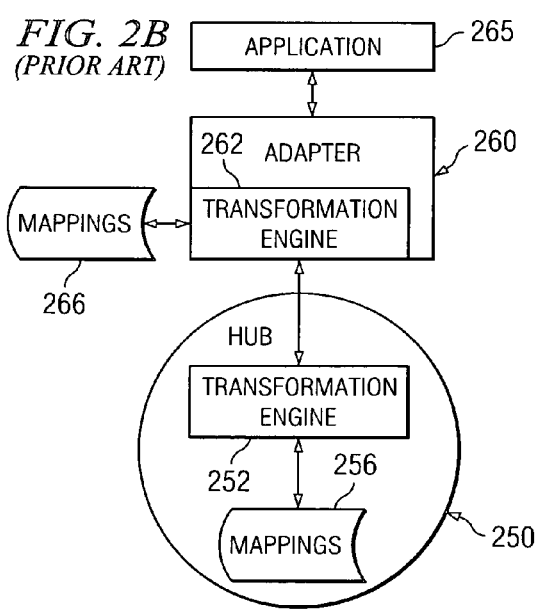

FIG. 4A
400 — GENERIC BO

| ATTRIBUTE | VALUE |
|---|---|
| FIRST NAME | BOB |
| MIDDLE INITIAL | K |
| LAST NAME | VANDELAY |
| ADDRESS LINE 1 | 13 DREW ST |
| ADDRESS LINE 2 | APT 1144 |
| ADDRESS LINE 3 | |
| ADDRESS LINE 4 | |
| ZIPCODE | 87722 |
| POSTALCODE | |
| CITY | NEWVILLE |
| COUNTY | MONTEY |
| PROVINCE | |
| STATE | CA |
| COUNTRY | USA |
| ACCOUNT NUMBER | 877-2221 |
| OPTIONAL FIELD 1 | 12/3/2004 |
| OPTIONAL FIELD 2 | |

FIG. 4B
420 — CRM APPLICATION BO

| ATTRIBUTE | VALUE |
|---|---|
| FIRST NAME | BOB |
| LAST NAME | VANDELAY |
| ADDRESS LINE 1 | 13 DREW ST |
| ADDRESS LINE 2 | APT 1144 |
| ADDRESS LINE 3 | 87722 |
| ADDRESS LINE 4 | NEWVILLE, CA |
| LAST CALL DATE | 12/3/2004 |
| LAST CALL TIME | 13:47 |
| LAST CALL REP | 382 |

422 { ADDRESS LINE 1–4 }
424 { LAST CALL DATE/TIME/REP }

FIG. 4C
430 — BILLING APPLICATION BO

| ATTRIBUTE | VALUE | |
|---|---|---|
| NAME | BOB K VANDELAY | 432 |
| ADDRESS | 13 DREW ST; APT 1144; 87722; NEWVILLE; CA | 434 |
| ACCOUNT NUMBER | 877-2221 | |
| LAST BILL AMOUNT | 17:54 | 436 |

FIG. 4D

450 MAPPINGS

| GBO FIELD | ASBO FIELD |
|---|---|
| FIRST NAME; MIDDLE INITIAL; LAST NAME | NAME |
| ADDRESS LINE 1; ADDRESS LINE 2; ADDRESS LINE 3 | ADDRESS |
| CITY | CITY |
| STATE | STATE |
| ZIPCODE | ZIPCODE |
| COUNTY | COUNTY |
| COUNTRY | COUNTRY |
| ACCOUNT NUMBER | ACCOUNT NUMBER |
| OPTIONAL FIELD 1 | LAST CALL DATE |
| OPTIONAL FIELD 2 | LAST CALL TIME |
| OPTIONAL FIELD 3 | LAST CALL REP |

FIG. 5A

500 TEST DOCUMENT

| ATTRIBUTE | VALUE |
|---|---|
| FIRST NAME | BOB |
| MIDDLE INITIAL | K |
| LAST NAME | VANDELAY |
| ADDRESS LINE 1 | 13 DREW ST |
| ADDRESS LINE 2 | APT 1144 |
| ADDRESS LINE 3 | N/A |
| ADDRESS LINE 4 | N/A |
| ZIPCODE | 87722 |
| POSTALCODE | N/A |
| CITY | NEWVILLE |
| COUNTY | MONTEY |
| PROVINCE | N/A |
| STATE | CA |
| COUNTRY | USA |
| ACCOUNT NUMBER | 877-2221 |
| OPTIONAL FIELD 1 | 12/3/2004 |
| OPTIONAL FIELD 2 | 17:54 |

FIG. 5B

DOCUMENTATION

| ATTRIBUTE | VALUE (SPOKE 1) | VALUE (SPOKE 2) | VALUE (SPOKE 3) | VALUE (SPOKE 4) |
|---|---|---|---|---|
| FIRST NAME | BOB K VANDELAY | BOB | BOB | BOB |
| MIDDLE INITIAL | | K | K | K |
| LAST NAME | | VANDELAY | VANDELAY | VANDELAY |
| ADDRESS LINE 1 | 13 DREW ST | 13 DREW ST | 13 DREW ST | 13 DREW ST |
| ADDRESS LINE 2 | APT 1144 | APT 1144 | APT 1144 | APT 1144 |
| ADDRESS LINE 3 | | 87722 | | N/A |
| ADDRESS LINE 4 | | | | |
| ZIPCODE | 87722 | | 87722 | 87722 |
| POSTALCODE | 9999 | | 9999 | 9999 |
| CITY | NEWVILLE | NEWVILLE | NEWVILLE | NEWVILLE |
| COUNTY | | | MONTEY | MONTEY |
| PROVINCE | N/A | N/A | N/A | N/A |
| STATE | CA | CA | CA | CA |
| COUNTRY | USA | | USA | USA |
| ACCOUNT NUMBER | 877-2221 | 877-2221 | 877-2221 | 877-2221 |
| OPTIONAL FIELD 1 | 12/3/2004 | | N/A | N/A |
| OPTIONAL FIELD 2 | | 17:54 | | |

END-TO-END BUSINESS INTEGRATION TESTING TOOL

BACKGROUND OF THE INVENTION

1. Technical Field

The present invention relates to data processing systems and, in particular, to application integration. Still more particularly, the present invention provides a method, apparatus, and program for testing application integration in a data processing system.

2. Description of Related Art

Application integration systems allow a company's applications to operate together. A main task of application integration is translating data and commands from the format of one application into the format of another application. Application integration is essentially data and command conversion on an on-going basis between two or more incompatible systems. Implementing application integration has traditionally been done by tedious programming. However, the trend today is to use message brokers, applications servers, and other specialized integration products that provide a common connecting point.

Most application integration systems may be classified as either point-to-point or hub-and-spoke systems. A traditional point-to-point integration scheme comprises a plurality of applications and a piece of integration code, also known as "middleware," for every two applications that must operate together. Prior art FIG. 1 illustrates an example point-to-point integration model. Application 110 and application 120 operate with one another. Integration logic 115 is provided to translate data and commands from the format of application 110 into the format of application 120 and vice versa. For small systems with a small number of applications, point-to-point integration may be used. However, as the number of applications increases, the number of pieces of integration code may grow exponentially. Thus, a point-to-point integration scheme may become unwieldy and is not easily extendible.

The hub-and-spoke integration scheme includes a hub of integration logic and several spokes. Typically, an application resides in each spoke and performs a function within the integration model. For example, a billing application may reside in one spoke and a customer database application may reside in another spoke. Because each application may be written independently without anticipating that the application will be integrated with other specific applications, the data models and interfaces may not agree. In other words, an application may expect data to be received in a first format while other applications in the system may output information in a second format. Adapter logic is provided between each application and the hub to convert or translate data so that each application receives data in an expected format.

With reference to prior art FIGS. 2A-2C, an example hub-and-spoke integration model is depicted. As shown in FIG. 2A, application 210 is connected to hub 202 by adapter 215. Similarly, application 220 is connected to hub 202 by adapter 225; application 230 is connected to hub 202 by adapter 235; and, application 240 is connected to hub 202 by adapter 245. The number of applications may vary depending upon the implementation.

Conventionally, the hub 202 consists of a generic business object model, such as generic business objects 204, a transformation engine that maps application specific objects (not shown) to generic business objects 204 and vice versa, and a collaboration engine (not shown) that executes any process logic that is part of synchronizing the hub-and-spoke integration scheme. The generic business object model describes data that is used by all applications. This is in contrast to an application specific business object model, which is specific to one given application. The transformation engine is described in more detail below with reference to FIG. 2B.

One skilled in the art will readily recognize that mappings 206 document how application specific objects map to generic business objects 204 and vice versa. When data is sent from a first application to a second application, a data object must first be converted (mapped) from the format of the first application to the generic business object model. Then, the data object must be mapped from the generic business object format to the application specific business object format of the second application. Mappings 206 are conventionally created by a developer with a priori knowledge of the application interfaces. Mappings 206 may be created using an editor, such as an extensible Markup Language (XML) editor or text editor; however, mappings 206 may be created using other means, such as automated tools and the like.

With reference now to FIG. 2B, each adapter may also include a conventional transformation engine, such as transformation engine 262 of adapter 260. Depending upon the implementation, transformation may take place in transformation engine 252 of hub 250, transformation engine 262 of adapter 260, or in both the hub and the adapter. For example, for application 265, some transformation may take place in hub 250 using transformation engine 252 and mappings 256 and some transformation may take place in adapter 260 using transformation engine 262 and mappings 266. In other examples, depending upon the application or the integration design, transformation may take place only in the adapter or only in the hub and this may vary from application to application within a single hub-and-spoke implementation.

Conventional mappings 256, 266 may consist of Java classes, stylesheets, code, or other formats for storing data. Whenever a new application is added in the hub-and-spoke integration scheme, one must only add a spoke to the scheme. Mappings 256 may include mappings for all applications for which transformations take place in the hub, while mappings 266, for example, include mappings only for application 265.

Prior art FIG. 2C illustrates the operation of a conventional hub-and-spoke business integration scheme. Application 1 270 attempts to send data, application specific business object 1 (ASBO) 292, to application 2 280. ASBO 1 292 is converted to generic business object (GBO) 294 through any combination of a transformation engine (not shown) in adapter 1 275 and a transformation engine (not shown) in hub 290. Then, GBO 294 is converted to an application specific business object, ASBO 2 296, for application 2 280 through any combination of a transformation engine (not shown) in adapter 2 285 and a transformation engine (not shown) in hub 290. Thus, application 1 270 sends data in a format expected by application 1 270 and application 2 280 receives data in a format expected by application 2 280. The conventional hub-and-spoke integration model works well if the mappings are correct. However, objects do not map properly from application to application when the mappings are not correct.

As one can see, application integration using the hub-and-spoke model poses significant data integration challenges as compared to the point-to-point model. These challenges spring from the very nature of the hub model and the necessity for a single integrated object model among all applications throughout the integration project. Knowing how each object maps to each application, which objects are used by the applications, and how a new application affects the existing model are difficult problems to be solved in the hub-and-spoke integration scheme. More particularly, when objects do not map properly from application to application, it is difficult to determine where the problem lies. Mappings may be incorrect in the hub or in any adapter in the integration model.

The only existing solution to solve the above problems consists of manual inspection of the object model after manual test runs of each spoke in the model. This solution is labor-intensive and prone to human error.

SUMMARY OF THE INVENTION

The present invention recognizes the disadvantages of the prior art and provides a tool for testing integration logic in a hub-and-spoke integration scheme. The testing tool of the present invention exercises spokes of the integration project for objects in the model. A hub sends a test document to an adapter in a spoke. One or both of a transformation engine in the hub and a transformation engine in the adapter converts the document from a generic object model to an application specific object model and then converts the document from the application specific object model back to the generic object model. The testing tool repeats this process by sending the test document through the adapter of each spoke. The testing tool then documents the return document of each spoke. The result is a catalog of total mappings, partial mappings, and empty mappings. These results may be analyzed to identify disagreements, lost data, and unused fields. The model may then be corrected by updating the mappings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 illustrates an example point-to-point integration model;

FIGS. 2A-2C illustrate an example hub-and-spoke integration model;

FIGS. 4A-4C illustrate example business objects in accordance with a preferred embodiment of the present invention;

FIG. 4D illustrates an example mapping in accordance with an exemplary embodiment of the present invention;

FIG. 5A illustrates an example of a test document in accordance with an exemplary embodiment of the present invention;

FIG. 5B illustrates an example of documentation in accordance with an exemplary embodiment of the present invention;

FIG. 8 is a flowchart illustrating the operation of an application integration testing tool in accordance with a preferred embodiment of the present invention.

DETAILED DESCRIPTION OF THE PREFERRED EMBODIMENT

Figure 2C:
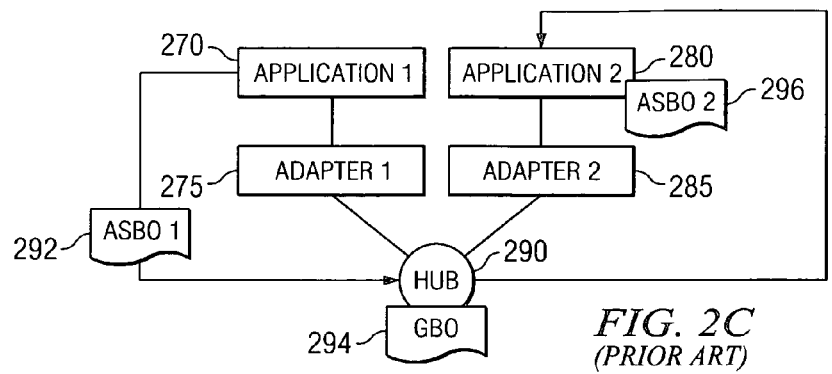
Figure 3:
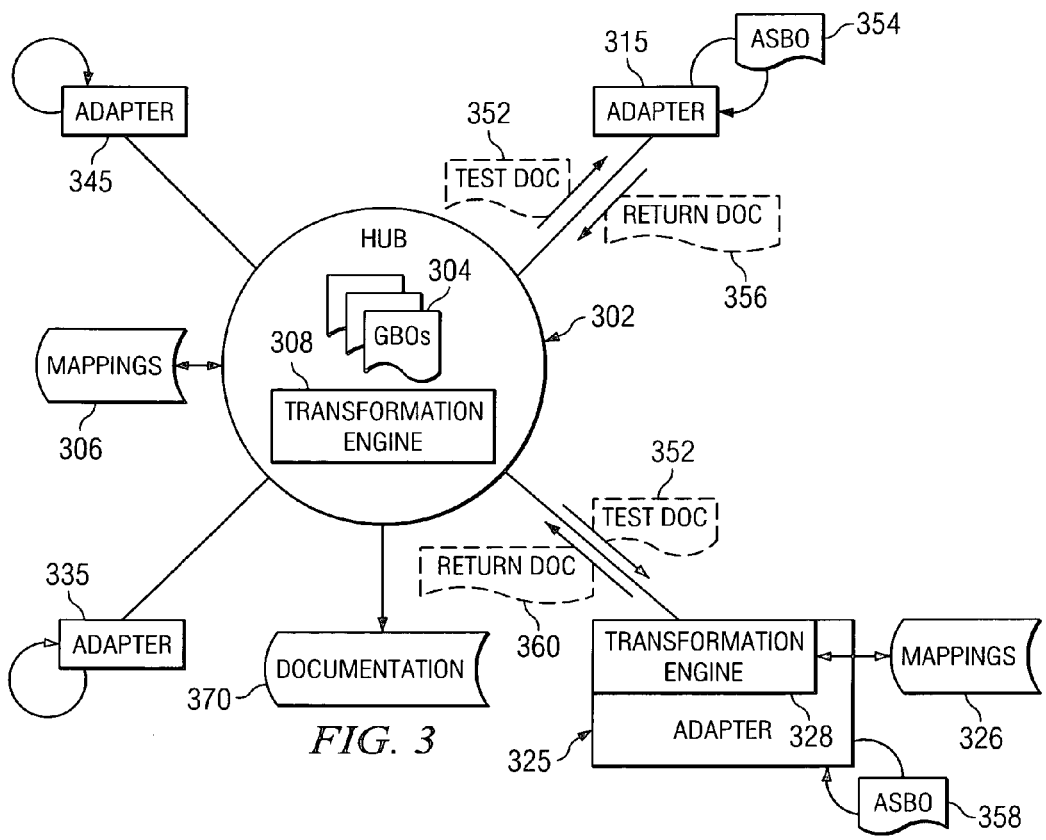
FIG. 3 depicts a pictorial representation of an integration model testing tool in accordance with a preferred embodiment of the present invention.

With reference now to the figures, FIG. 3 depicts a pictorial representation of an integration model testing tool in accordance with a preferred embodiment of the present invention. Adapter 315 is provided to connect an application (not shown) to hub 302. Similarly, adapters 325, 335, and 345 are provided to connect applications to hub 302. The number of adapters may vary depending upon the implementation.

Typically, conventional hub 302 includes generic business objects 304, transformation engine 308 that maps all of the application specific objects to generic form and vice versa, and a conventional collaboration engine (not shown) that executes any process logic that is part of synchronizing the hub-and-spoke business integration scheme. A generic business object (GBO) provides fields that describe the data used by all applications. This is in contrast to an application specific business object (ASBO), which is specific to one given application. Mappings 306 document how ASBOs map to GBOs and vice versa. Mappings 306 may consist of Java classes, stylesheets, code, or other formats for storing data (described in further detail herein).

Each adapter in the business integration model 300 may also include a conventional transformation engine, such as transformation engine 328 in adapter 325. Depending upon the implementation, transformation for an application (not shown) corresponding to adapter 325 may take place in transformation engine 308 of hub 302, transformation engine 328 of adapter 325, or in both the hub and the adapter. For example, for the application corresponding to adapter 325, some transformation may take place in hub 302 using transformation engine 308 and mappings 306 and some transformation may take place in adapter 325 using transformation engine 328 and mappings 326. In other examples, depending upon the application or the integration design, transformation may take place only in the adapter or only in the hub and this may vary from application to application within a single hub-and-spoke implementation.

Conventional mappings 306, 326 may consist of Java classes, stylesheets, code, or other formats for storing data. Mappings 306, 326 are conventionally created by a developer with a priori knowledge of the application interfaces. Mappings 306, 326 may be created using an editor, such as an extensible Markup Language (XML) editor or text editor; however, mappings 306, 326 may be created using other means, such as automated tools and the like. Whenever a new application is added in the hub-and-spoke integration scheme, one must only add a spoke to the scheme. Mappings 306 may include mappings for all applications for which transformations take place in the hub, while mappings 326, for example, include mappings only for application 325.

FIGS. 4A-4C illustrate example business objects in accordance with a preferred embodiment of the present invention. More particularly, FIG. 4A illustrates an example GBO 400. FIG. 4B illustrates a customer relation management (CRM) object 420, which is an example of an ASBO for a CRM application. In this example, only a subset of the fields in the GBO 400 are used in ASBO 420. The CRM ASBO 420 also uses address lines 422 to store zip code, city, and state information. The CRM ASBO also includes additional fields 424 that are not included in the GBO, such as "Last Call Time" and "Last Call Rep." Transformation engines in a hub or in an adapter for a CRM application would map the fields of GBO 400 to the fields of ASBO 420 and vice versa using mappings, such as mappings 306 and/or mappings 326 in FIG. 3.

FIG. 4C illustrates a billing application object 430, which is another example of an ASBO. The billing application business object 430 includes very few fields compared to GBO 400. In fact, the first name, middle initial, and last name are all stored in a single "Name" field 432. Also, all address data is stored in a single "Address" field 434. Billing ASBO 430 also includes an additional field 436 that is not included in GBO 400.

FIG. 4D illustrates an example mapping in accordance with an exemplary embodiment of the present invention. Mappings 450 describe how fields from a GBO are to be mapped to fields of an ASBO for given application. For example, the fields "First Name," "Middle Initial," and "Last Name" in the GBO model are mapped to a single "Name" Field in the ASBO model. Similarly, fields "Address Line 1," "Address Line 2," "Address Line 3" in the GBO model are mapped to a single "Address" filed in the ASBO model. As another example, an "Optional Field 1" field in the GBO model is mapped to a "Last Call Date" field in the ASBO model. In the depicted example, mappings 450 are shown as a table; however, mappings 450 may alternatively consist of Java classes, stylesheets, code, or other formats for storing data (described in further detail herein).

Returning to FIG. 3, in accordance with a preferred embodiment of the present invention, hub 302 sends test document 352 (described herein) to adapters 315, 325, 335, 345 for a round-trip back to hub 302. In the present invention, transformation engine 308 converts test document 352 to ABSO 354 using mappings 306 and converts ABSO 354 back to a generic object, as return document 356, using mappings 306. In this example, as shown in FIG. 3, adapter 315 may not have a transformation engine. Thus, adapter 315 simply conveys data to or from the application (not shown).

However, when test document 352 is sent to the spoke of adapter 325, test document 352 may be converted to ABSO 358 by transformation 308 or transformation 328 or both. The ABSO is then converted back to a GBO using one or both of transformation engine 308 and transformation engine 328 to form return document 360. The adapters 315, 325, 335, 345 may be modified to enable a round-trip of documents from the hub 302 without forwarding documents to the applications.

Test document 352 may be a GBO, such as GBO 400 in FIG. 4A, that includes every field for the object. Next, the testing tool populates every field in the test document 352. For example, test document 352 may look like the example shown in FIG. 4A with every field populated with a value. Each of the return documents, such as return document 356 and return document 360, should be identical to test document 352 if the mappings are correct. If a particular return document is different from test document 352, then this may indicate a problem with mappings. For example, if return document 356 is not identical to test document 352, then mappings 306 may be incorrect. If return document 360 is not identical to test document 352, then mappings 306, mappings 326, or both may be incorrect.

The testing tool documents the return document of each spoke into documentation 370. The result is a catalog of mapped fields for every return document for every spoke in the model. The mapped fields may include totally mapped fields, partially mapped fields, and empty mappings. These results in documentation 370 may be analyzed to identify disagreements, lost data, and unused fields. The hub-and-spoke business integration model may then be corrected by updating mappings, such as mappings 306 and mappings 326.

Each data field from the test document 352 may be recorded in documentation 370 as a total mapping, a partial mapping, or an empty mapping. A totally mapped field is one in which every spoke returns the same data in the same field in which it was sent. FIG. 5A illustrates an example of a test document in accordance with an exemplary embodiment of the present invention, while FIG. 5B illustrates an example of documentation in accordance with an exemplary embodiment of the present invention. In FIG. 5B, if every return document has a value of "Newville" for "City" field 524, then "City" field 524 is totally mapped. This is the expected outcome and indicates that the field is properly mapped for all applications.

Partial mappings result when different spokes "disagree" on the return value for a particular field. For example, if test document 500 in FIG. 5A is sent to spoke 1 and the transformation engine(s) in that spoke maps the first name, middle initial, and last name to a single field, "First Name" field 512, then this will result in a disagreement, because the other spokes will result in these fields being mapped to three separate fields 512, 514, 516, as shown in FIG. 5B.

As another example, the transformation engine(s) in spoke 2 may return a document with "Address Line 3" field 518 populated with a value of "87722." This indicates a disagreement in the mapping, which would result in a partial mapping because not all spokes would return the same value for that field. Spoke 2 may also return the document with an empty "ZipCode" field 522. This is a disagreement that must be corrected in the mappings or adapter code.

Empty mappings are mappings for which all spokes return an empty data field in the return document. If this occurs then there are unused data fields in the model. As an example, the "Address Line 4" field 520 in the example in FIG. 5B has no data being returned from any spoke. This is referred to as an empty mapping, because all spokes return no value for the field. If a field is unused, it may be removed or used for other data. For example, a simple "YES/No" field may be converted to a gender field (MALE/FEMALE).

With reference again to FIG. 3, as an example, adapter 315 may be an adapter for a billing server. Adapter 325 may be an adapter for a customer database. Adapter 335 may be an adapter for a metering application server. And adapter 345 may be an adapter for an employee database. To exercise the spokes, the testing tool creates a fully-defined sample GBO, in this case a customer object with every attribute specified by a unique variable. The testing tool sends this sample through every spoke that supports it. In this example, adapter 345 for the employee database may not support a customer object.

For each round trip of the sample engine through a given spoke, one or both of transformation 308 in hub 302 and a transformation engine in an adapter, such as transformation engine 328, receive the test document, convert the test document to an application specific representation of the test document, convert the application specific representation back to the generic representation, and return the generic representation of the test document to the hub 302. The result is an object that has round-tripped the spoke. By comparing the resulting variables in this round-tripped document for all adapters, the testing tool may create a mapping visualization. An operator may then access the documentation of the round-tripped documents and analyze the visualization to find disagreements, lost data, and unused data fields.

Figure 6:
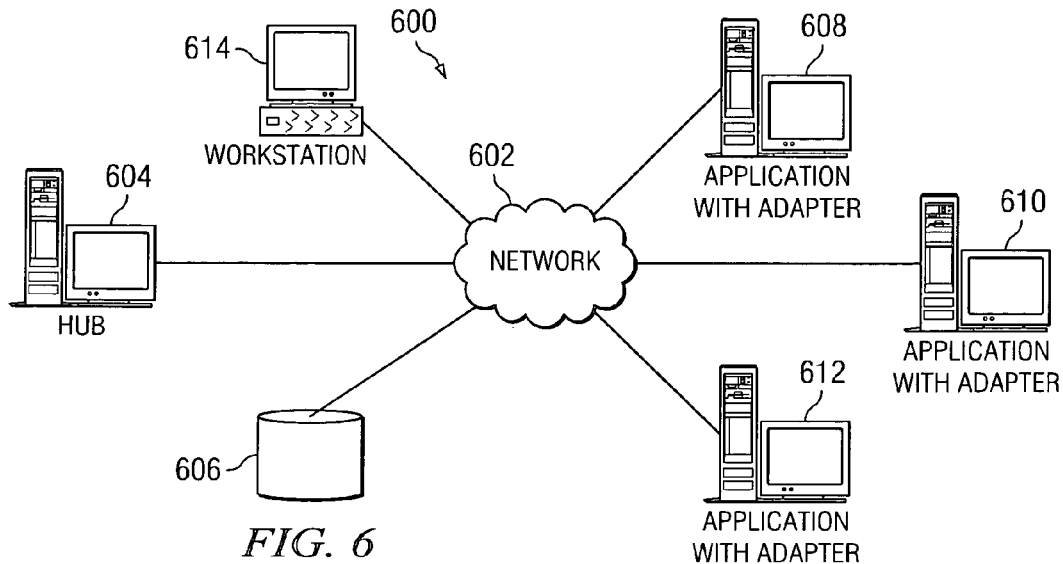
FIG. 6 depicts a pictorial representation of a network of data processing systems in which the present invention may be implemented.

FIG. 6 depicts a pictorial representation of a network of data processing systems in which the present invention may be implemented. Network data processing system 600 is a network of computers in which the present invention may be implemented. Network data processing system 600 contains a network 602, which is the medium used to provide communications links between various devices and computers connected together within network data processing system 600. Network 602 may include connections, such as wire, wireless communication links, or fiber optic cables.

In the depicted example, hub server 604 is connected to network 602 along with storage unit 606. Integration logic, such as generic business objects 605 and mappings 306 in FIG. 3, may be stored in storage unit 606. In addition, application servers 608, 610, and 612 are connected to network 602. These application servers 608, 610, and 612 may also have adapters for connection to hub 604 and may also store integration logic, such as mappings 326 in FIG. 3. In the depicted example, hub server 604 provides integration logic for application servers 608-612. Network data processing system 600 may include additional servers and other devices not shown.

Workstation 614 is connected to network 602. An operator may use workstation 614 to access documentation stored in storage 606. For example, after the spokes have been exercised, an operator may access the documentation to analyze the object model and mappings. The operator may also use workstation 614 to update mappings in hub server 604 or any one or more of application servers 608, 610, 612 that may have integration logic therein to correct disagreements and the like.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 600 also may be implemented as a number of different types of networks, such as for example, an intranet, a local area network (LAN), or a wide area network (WAN). FIG. 6 is intended as an example, and not as an architectural limitation for the present invention.

Figure 7:
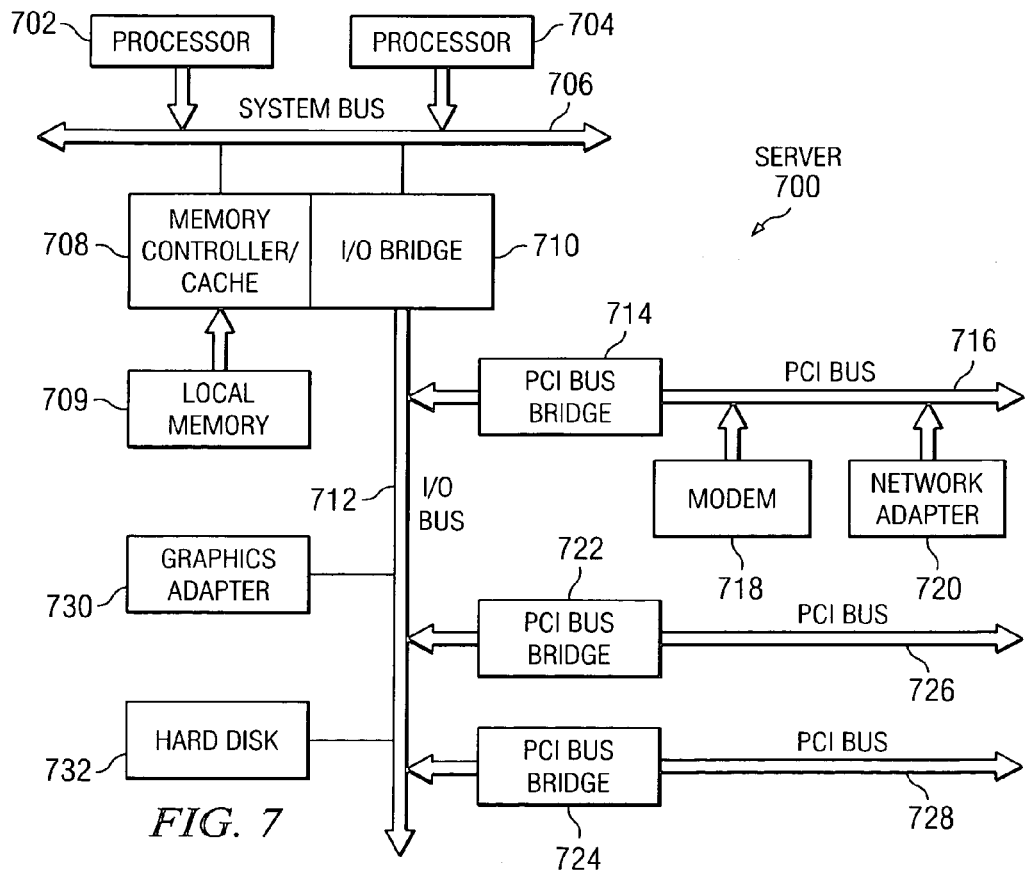
FIG. 7 is a block diagram of a data processing system that may be implemented as a server in accordance with a preferred embodiment of the present invention.

Referring to FIG. 7, a block diagram of a data processing system that may be implemented as a server, such as hub server 604 in FIG. 6, is depicted in accordance with a preferred embodiment of the present invention. Data processing system 700 may be a symmetric multiprocessor (SMP) system including a plurality of processors 702 and 704 connected to system bus 706. Alternatively, a single processor system may be employed. Also connected to system bus 706 is memory controller/ cache 708, which provides an interface to local memory 709. I/O bus bridge 710 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of modems may be connected to PCI local bus 716. Typical PCI bus implementations will support four PCI expansion slots or add-in connectors. Communications links to application servers 608-614 in FIG. 6 may be provided through network adapter 720, for example, connected to PCI local bus 716 through add-in connectors.

Additional PCI bus bridges 722 and 724 provide interfaces for additional PCI local buses 726 and 728, from which additional modems or network adapters may be supported. In this manner, data processing system 700 allows connections to multiple network computers. A memory-mapped graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention. The data processing system depicted in FIG. 7 may be, for example, an IBM eServer pSeries system, a product of International Business Machines Corporation in Armonk, N.Y., running the Advanced Interactive Executive (AIX) operating system or LINUX operating system.

FIG. 8 is a flowchart illustrating the operation of an application integration testing tool in accordance with a preferred embodiment of the present invention. The process begins and generates a test document (step 802). The hub sends the test document to an adapter for a round-trip back to the hub (step 804). After the transformation engine(s) convert generic objects to application specific objects and then converts the application specific objects back to generic objects, the hub receives a return document for the spoke (step 806). The testing tool then documents the fields in the return document (step 808).

A determination is made as to whether the spoke is the last spoke in the model (step 810). If the spoke is not the last spoke, the testing tool considers the next adapter (step 812) and returns to step 804 to send the test document to the next adapter. If the spoke is the last spoke in step 810, the process analyzes the documentation to find disagreements, lost data, and unused fields (step 814). Thereafter, the process updates mappings, if necessary (step 816). Then, the process ends.

Thus, the present invention solves the disadvantages of the prior art by providing a tool for testing application integration models, particularly integration logic in a hub-and-spoke integration scheme. The testing tool of the present invention exercises spokes of the integration project for objects in the model. A test document is sent to each adapter. One or both of a transformation engine in the hub and a transformation engine in the adapter of a given spoke converts the generic object to an application specific object and then converts the application specific object back to generic object. The testing tool then documents the return document of each spoke. The result is a catalog of total mappings, partial mappings, and empty mappings. These results may be analyzed to identify disagreements, lost data, and unused fields. The model may then be corrected by updating the mappings.

The testing tool of the present invention also applies to messaging-bus type integration architectures as long as there exists a common object model and mapping repository. The testing tool of the present could then send test objects to the components of the architecture and update the mappings based on the results.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for mapping between a generic object model and application specific object models of applications in an integration model having mapping logic, the method comprising:
    generating a test document having a plurality of fields;
    sending the test document to each adapter within a plurality of adapters, wherein each adapter within the plurality of adapters includes a transformation engine and mappings, and wherein the plurality of adapters provide connections to the applications;
    receiving a return document from each adapter to form a set of returned documents;
    comparing the set of returned documents to determine how each field within the plurality of fields is mapped among the plurality of adapters; and
    presenting documentation of the field mappings to an operator.

2. The method of claim 1, wherein the integration model includes a hub and a plurality of spokes, wherein each of the plurality of spokes has an adapter for connecting an application to the hub.

3. The method of claim 2, wherein the test document includes a generic object.

4. The method of claim 3, wherein the transformation engine in a given adapter within the plurality of adapters converts the generic object to an application specific object and converts the application specific object back to a generic object.

5. The method of claim 3, wherein a transformation engine in the hub converts the generic object to an application specific object and converts the application specific object back to a generic object.

6. The method of claim 1, wherein the integration model is a message-based integration model.

7. The method of claim 1, wherein the test document includes a generic object.

8. The method of claim 1, further comprising:
    identifying at least one of disagreements in mapping of fields among adapters, lost data in fields in return documents from one or more adapters, and unused fields in return documents from one or more adapters.

9. The method of claim 1, further comprising:
    updating the mapping logic based on the documentation.

10. The method of claim 1, wherein presenting documentation of the field mappings to an operator, comprises:
    presenting documentation describing how each field within the plurality of fields is mapped among the plurality of adapters to the operator.

11. An apparatus for mapping between a generic object model and application specific object models of applications in an integration model, the apparatus comprising:
    a hub, wherein the hub has the generic object model and mapping logic for mapping between the generic object model and the application specific object models;
    a plurality of spokes, wherein each of the plurality of spokes has an adapter for connecting an application to the hub, wherein each adapter includes a transformation engine and mappings,
    wherein the hub generates a test document including a plurality of fields, sends the test document to each adapter within a plurality of adapters, receives a return document from each adapter to form a set of returned documents, compares the set of return documents to determine how each field within the plurality of fields is mapped among the plurality of adapters, and presents documentation of the field mappings to an operator.

12. The apparatus of claim 11, wherein the test document includes a generic object.

13. The apparatus of claim 12, wherein the transformation engine in a given adapter within the plurality of adapters converts the generic object to an application specific object and converts the application specific object back to a generic object.

14. The apparatus of claim 12, wherein a transformation engine in the hub converts the generic object to an application specific object and converts the application specific object back to a generic object.

15. The apparatus of claim 11, wherein the hub is implemented on a server device.

16. The apparatus of claim 11, wherein each application and its respective adapter are implemented on a server device.

17. An apparatus for mapping between a generic object model and application specific object models of applications in an integration model having mapping logic, the apparatus comprising:
    means for generating a test document including a plurality of fields;
    means for sending the test document to each adapter within a plurality of adapters, wherein each adapter within the plurality of adapters includes a transformation engine and mappings, and wherein the plurality of adapters provide connections to the applications;
    means for receiving a return document from each adapter to form a set of returned documents;
    means for comparing the set of returned documents to determine how each field within the plurality of fields is mapped among the plurality of adapters; and
    means for presenting documentation of the field mappings to an operator.

18. The apparatus of claim 17, wherein the integration model includes a hub and a plurality of spokes, wherein each of the plurality of spokes has an adapter for connecting an application to the hub.

19. The apparatus of claim 18, wherein the test document includes a generic object.

20. The apparatus of claim 19, wherein the transformation engine in a given adapter within the plurality of adapters converts the generic object to an application specific object and converts the application specific object back to a generic object.

21. The apparatus of claim 19, wherein a transformation engine in the hub converts the generic object to an application specific object and converts the application specific object back to a generic object.

22. The apparatus of claim 17, wherein the integration model is a message-based integration model.

23. The apparatus of claim 17, wherein the test document includes a generic object.

24. The apparatus of claim 17, further comprising:
means for identifying at least one of disagreements in mapping of fields among two or more adapters, lost data in fields in return documents from one or more adapters, and unused fields in return documents from one or more adapters.

25. The apparatus of claim 17, further comprising:
means for updating the mapping logic based on the documentation.

26. The apparatus of claim 17, wherein the means for presenting documentation of the field mappings to an operator, comprises:
means for presenting documentation describing how each field within the plurality of fields is mapped among the plurality of adapters to the operator.

27. A computer program product, in a recordable-type computer readable medium, for mapping between a generic object model and application specific object models of applications in an integration model having mapping logic, the computer program product comprising:
instructions for generating a test document including a plurality of fields;
instructions for sending the test document to each adapter within a plurality of adapters, wherein each adapter within the plurality of adapters includes a transformation engine and mappings, and wherein the plurality of adapters provide connections to the applications;
instructions for receiving a return document from each adapter;
instructions for determining how each field within the plurality of fields is mapped among the plurality of adapters; and
instructions for presenting documentation of the field mappings to an operator.

* * * * *